(12) United States Patent
Fischer et al.

(10) Patent No.: US 9,922,143 B2
(45) Date of Patent: Mar. 20, 2018

(54) METHOD AND CONTROL FOR CARRYING OUT A CALCULATION OF A DATA-BASED FUNCTION MODEL

(71) Applicant: Robert Bosch GmbH, Stuttgart (DE)

(72) Inventors: Wolfgang Fischer, Gerlingen (DE); Andre Guntoro, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1006 days.

(21) Appl. No.: 14/247,484

(22) Filed: Apr. 8, 2014

(65) Prior Publication Data

US 2014/0309972 A1    Oct. 16, 2014

(30) Foreign Application Priority Data

Apr. 10, 2013   (DE) ........................ 10 2013 206 264

(51) Int. Cl.
*G06F 7/60* (2006.01)
*G06F 17/10* (2006.01)
*G06F 17/50* (2006.01)

(52) U.S. Cl.
CPC ...... *G06F 17/5009* (2013.01); *G06F 2217/16* (2013.01)

(58) Field of Classification Search
None
See application file for complete search history.

(56) References Cited

U.S. PATENT DOCUMENTS

2011/0257949 A1* 10/2011 Vasudevan ............ G06F 17/18
                                                      703/2
2012/0179635 A1*  7/2012 Vasudevan ............ G06T 7/521
                                                      706/12

FOREIGN PATENT DOCUMENTS

WO    WO 2011134764 A1 * 11/2011    ......... F02D 41/1401

OTHER PUBLICATIONS

Bloch, Gerard et al., "Support Vector Regression from Simulation Data and Few Experimental Samples", 2008, Information Sciences 178, Elsevier Inc.*

* cited by examiner

*Primary Examiner* — Cedric D Johnson
(74) *Attorney, Agent, or Firm* — Norton Rose Fulbright US LLP; Gerard Messina

(57) ABSTRACT

A method for carrying out a calculation of a data-based function model, in particular a Gaussian process model, the data-based function model being defined by predefined hyperparameters and node data, multiple input variables being assigned to one output variable and having a sum of terms, each of which depend on one of the input variables, including the following: determining at least one input variable to be varied, for which multiple output values of a corresponding output variable are to be determined; calculating the sum of the terms, which depend on the input variables not to be varied; providing multiple input values for each of the determined at least one input variable to be varied; and ascertaining multiple output values of the output variable for the provided multiple input values, each based on the calculated sum of the terms, which depend on the input variables not to be varied.

19 Claims, 2 Drawing Sheets

US 9,922,143 B2

METHOD AND CONTROL FOR CARRYING OUT A CALCULATION OF A DATA-BASED FUNCTION MODEL

RELATED APPLICATION INFORMATION

The present application claims priority to and the benefit of German patent application no. 10 2013 206 264.8, which was filed in Germany on Apr. 10, 2013, the disclosure of which is incorporated herein by reference.

FIELD OF THE INVENTION

The present invention relates to methods for calculating a data-based function model, in particular measures for optimizing an execution of such a calculation method.

BACKGROUND INFORMATION

In current implementations for calculating a data-based function model in a control unit, a value for an output variable is calculated for a certain number of input variables, i.e., an input variable vector of a certain dimension. For many applications, however, it is advisable to calculate not just one but multiple values of the output variable for a varying input variable of the input variable vector. In other words, one input variable is varied and the corresponding variation in the output variable is ascertained. This may be used in particular when an inversion of the data-based function model is to be used, i.e., when a corresponding change in one of the input variables is to be deduced when an output variable is predefined.

SUMMARY OF THE INVENTION

According to the present invention, the method for carrying out a calculation of a data-based function model, in particular a Gaussian process model, is provided according to the description herein, and the device and the computer program product are provided according to the further descriptions herein.

Additional advantageous embodiments of the present invention are specified in the further descriptions herein.

According to a first aspect, a method for carrying out a calculation of a data-based function model is provided, in particular a Gaussian process model. The data-based function model is defined by predefined hyperparameters and node data, assigns multiple input variables to one output variable and has a sum of terms, each of which depends on one or only one input variable. This method includes the following operations:
  determining at least one input variable to be varied, for which multiple output values of a corresponding output variable are to be determined;
  calculating the sum of the terms, each of which depends on the input variables not to be varied;
  providing multiple input values for each of the at least one determined input variable to be varied, and
  ascertaining multiple output values of the output variable for the provided multiple input values, each based on the calculated sum of terms, which depend on the input variables not to be varied.

One idea of the above-described method for carrying out a calculation of a data-based function model is to simplify the calculation of the output values of an output variable by the data-based function model, in particular for cases in which only one or a few of the input variables are varied and the other input variables have constant input values for the calculation. This is made possible by calculating multiple output values of the output variable at the same time when at least one of the input variables is varied and all the other input variables of the input variable vector are kept constant. The calculation of the multiple output values of the output variable includes a series of computation operations, namely the operations for calculation of the sum of the terms, which are identical and therefore must be carried out only once. Calculation of multiple output variables may be accelerated significantly in this way, while varying only a few input variables.

In a Gaussian process model as a data-based function model in particular, a sum of terms is formed, each of which depends on an input value of only one of the input variables. If there should be a calculation of multiple output values of one output variable based on variation of one or a few input variables, then the sum of the corresponding terms of the input values, which remain constant, of the other input variables may be provided by a one-time calculation. The result of the one-time calculation is then used for calculating the sums for the multiple input values of the corresponding variable input variable. Computation effort may thus be reduced accordingly.

In addition, it may also be provided that the terms are dependent on only one node.

According to one specific embodiment, to ascertain additional output values of the output variable based on a variation of the input values of the at least one input variable to be varied, an interpolation may be carried out between the multiple output values already ascertained.

For example, it is possible to calculate three output values for three input values of one input variable while retaining the input values of the other input variables without requiring triple the computation time. Interpolation is possible using three input values and corresponding output values to be able to ascertain easily the output values in between.

It may be provided that an interpolation takes place between the input values of the input variable for the inverted calculation of reverse-extrapolated input values of the input variable to be varied when multiple setpoint output values of the output variable are predefined. A simple inversion of the implemented data-based function model is therefore possible since an output value of the output variable may be calculated back to a corresponding input value of the input variable through interpolation of the relationship between the input values of the input variable which has been varied and the corresponding output values of the output variable.

In addition, the interpolation may include a linear or polynomial interpolation.

According to another aspect, a device is provided for carrying out a calculation of a data-based function model, in particular a Gaussian process model. The data-based function model is defined by predefined hyperparameters and node data, assigns multiple input variables to one output variable, and has a sum of terms, each of which depends on an input variable. The device is configured:
  to determine at least one input variable, which is to be varied and for which multiple output values of a corresponding output variable are to be determined;
  to calculate the sum of the terms, which depend on the input variables not to be varied;
  to provide multiple input values for each of the at least one determined input variable, and
  to ascertain multiple output values of the output variable for the provided multiple input values, each based on the calculated sum of the terms, which depend on the input variables not to be varied.

According to another aspect, a computer program is provided which is configured to execute all steps of the above method.

Specific embodiments of the present invention are explained in greater detail below on the basis of the accompanying drawings.

DETAILED DESCRIPTION

For engine controllers for internal combustion engines, there are data-based non-parametric function models, which must be calculated in both directions for at least a few of the input variables. In other words, on the one hand, for a number D of input variables, one output variable is calculated, but on the other hand, one of the input variables is exchanged with the output variable in a reverse direction of calculation and then the function model is calculated.

One example of this is an air system model, in which an output variable representing the filling, for example, is calculated, correlating with the engine torque in a gasoline engine having lambda=1, based on input variables, which may include, for example, air temperature, engine rotational speed, charge pressure and throttle valve angle, among other things. A minor change in the setpoint torque thus corresponds to a minor change in the filling, which must be achieved by a change in the throttle valve angle. The change in the throttle valve position may be ascertained then by a reverse calculation of the air system model.

However, when using data-based function models in the form of Gaussian process models in a control unit, general inversion of the function model presents problems since the Gaussian process models cannot readily be inverted.

The use of non-parametric data-based function models is based on a Bayesian regression method. The Bayesian regression is a data-based method based on a model. To create the model, measuring points and the corresponding output data of an output variable which define the training data are required. The model is created by determining node data and abstract hyperparameters, which parameterize the model function space and effectively weight the influence of the individual measuring points of the node data on the later model prediction. The node data may correspond to training data, be selected from training data or be generated from training data.

Figure 1:
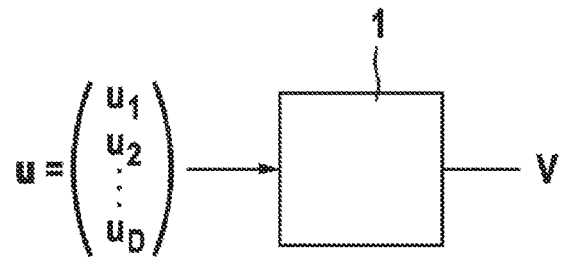
FIG. 1 shows a schematic diagram of a Gaussian process model having an input variable vector as the input and an output variable as the output.

It is apparent from FIG. 1 that applying input variable vector u to Gaussian process model 1 results in an output variable v. In other words, input variable vector $u_1$ results in a first output value of output variable v, and another input variable vector u results in a second output value of output variable v. The Gaussian process model is given by the following formula:

$$v = \sum_{i=1}^{N} (Q_y)\sigma_f \exp\left(t - \frac{1}{2}\sum_{d=1}^{D} \frac{((x_i)_d - u_d)^2}{l_d}\right)$$

where $$u_d = \frac{\tilde{u}_d - (m_x)_d}{(s_x)_d}$$

for input standardization to a standardized input variable $u_d$ from input variable $\tilde{u}_d$ and $$\tilde{v} = v s_y + m_y$$

for output standardization of a standardized output variable v to an output variable $\tilde{v}$,
where $Q_y$, $\sigma_f$, $l_d$ (d=1, ..., D) correspond to hyperparameters of the Gaussian process model, D corresponds to the number of input variables in input variable vector u, $x_n$ stands for n=1, ..., N nodes of the Gaussian process model, $m_x$ corresponds to the mean value of the input value $(x_i)_d$ (i=1, ..., N, where N corresponds to the number of nodes of the node data) of the corresponding input variable, $s_x$ corresponds to the variance of the input value $(x_i)_d$ of the corresponding input variable, $m_y$ corresponds to the mean value of output values $y_i$ of the corresponding output variable from the training data $((x_i)_d, y_i)$ or node data, and $s_y$ corresponds to the variance of output values $y_i$ of the corresponding output variable from the training data $((x_i)_d, y_i)$ and node data.

If output values of output variable v are calculated for multiple input values of one of the input variables, for example, for an input variable vector u, for example, input variable $u_F$, then it is necessary to calculate a term t for each of these calculations:

$$t = -\frac{1}{2} \sum_{d=1, d\neq F}^{D} \frac{((x_i)_d - u_d)^2}{l_d}$$

where F corresponds to the index of the varying input variable, for which the multiple input values are to be calculated. By optimizing the calculation process, it is thus possible to carry out the calculation of the above term only one time in order to calculate multiple output values based on multiple input values of an input variable at constant input values of the other input variables.

Calculation of the multiple output values thus easily yields the following for the multiple input values of the input variable $u_F$:

$$v = \sum_{i=1}^{N} (Q_y)\sigma_f \exp\left(t - \frac{1}{2}\frac{((x_i)_F - u_F)^2}{l_F}\right).$$

By interpolation, an input value range of an input variable $u_F$ may thus be assigned to an output value range of output variable v in this way, so that the output value may be obtained by an essentially known linear or polynomial interpolation without calculation of the data-based function model with a variation in a corresponding input variable $u_F$ while other input variables $u_{d,d\neq F}$=const. remain constant within the input value range.

Figure 2:
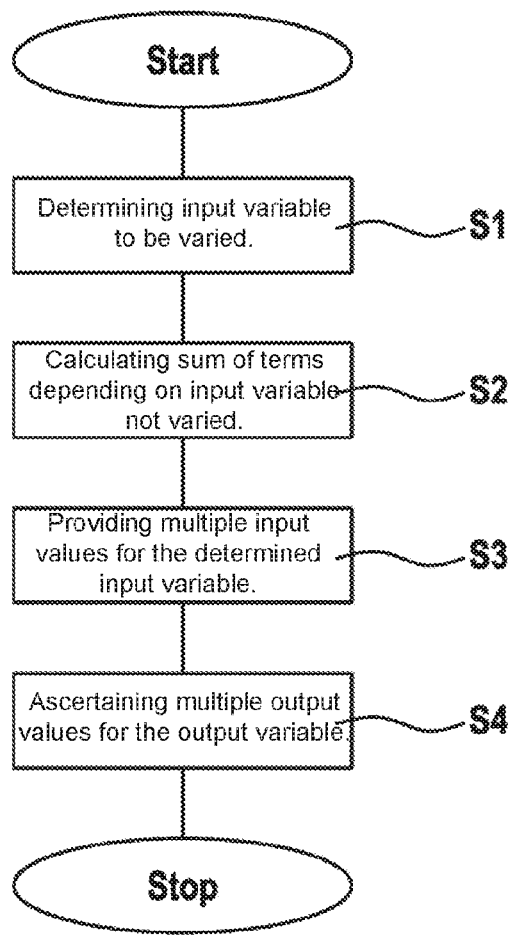
FIG. 2 shows a flow chart to illustrate the method for carrying out a calculation of a data-based function model based on node data.

The method for carrying out the calculation of the data-based Gaussian process model is schematically shown as a flow chart in FIG. 2.

In step S1, the at least one input variable to be varied is determined, for which multiple output values of a corresponding output variable are to be calculated.

In step S2, the sum of the terms is calculated which depend on the input variable not to be varied.

In step S3, multiple input values are provided for each of the at least one determined input variable to be varied, in particular for calculation in a control unit.

In step S4, multiple output values of the output variable for the provided multiple input values are each ascertained, based on the calculated sum of the terms, which depend on the input variables not to be varied.

In addition, a reverse calculation, i.e., an inversion of the data-based function model, may be implemented easily by assigning a corresponding input value of the input variable to a predefined output value within the previously ascertained output value range of the output variable by interpolation.

In a control unit, in which the calculation of the data-based function model is carried out in a model calculation unit which is separate from an arithmetic unit, the model calculation unit may be configured to also obtain index F in addition to the hyperparameters and the node data, which form the configuration data, so that the calculation described above is carried out. This yields a greater flexibility.

Figure 3:
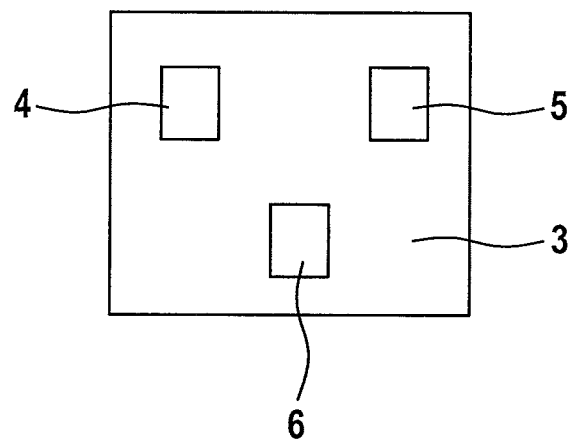
FIG. 3 shows a schematic diagram of a control unit having a separate model calculation unit.

FIG. 3 shows a schematic diagram of a control unit, in particular for an engine system having an internal combustion engine. Control unit 3 may be configured to be integrated and may have an arithmetic unit 4 in the form of a microcontroller, a model calculation unit 5 and a memory unit 6. For calculation of output values of a data-based function model, the hyperparameters and the node data are retrieved from memory unit 6 and loaded into model calculation unit 5. In addition, data is transmitted to define the input variables for which varying input values are provided to ascertain the accordingly assigned output values. Model calculation unit 5 then carries out the method described above, which is implemented in hardware, so that with appropriate signaling, multiple output values for multiple input values of one or multiple input variables are ascertained and are transmitted back to arithmetic unit 4 after the calculation. Arithmetic unit 4 may then carry out the interpolation described above as needed.

What is claimed is:

1. A method for performing a calculation of a data-based function model to control an internal combustion engine, the method comprising:
   determining at least one input variable of the internal combustion engine to be varied and provided as input to the model, for which multiple output values of a corresponding output variable of the internal combustion engine are to be determined using the model, wherein the data-based function model is defined by predefined hyperparameters and node data, multiple input variables being assigned to one output variable and having a sum of terms, each of which depends on one of the input variables;
   calculating the sum of the terms, which depend on the input variables not to be varied;
   providing multiple input values for each of the at least one determined input variable to be varied;
   ascertaining a plurality of output values of the output variable for the provided multiple input values, each based on the calculated sum of the terms, which depend on the input variables not to be varied; and
   controlling the internal combustion engine based on setting at least one of the at least one input variable or the at least one output variable based on the ascertained plurality of output values.

2. The method of claim 1, wherein the terms each depend on only one node.

3. The method of claim 1, wherein an interpolation is carried out between the multiple output values already ascertained in order to ascertain additional output values of the output variable based on a variation in the input values of the at least one input variable to be varied.

4. The method of claim 3, wherein the interpolation includes a linear or polynomial interpolation.

5. The method of claim 1, wherein the data-based function model is a Gaussian process model.

6. The method of claim 1, further comprising carrying out an interpolation between the input values of the input variable based on the ascertained output values.

7. A method for performing a calculation of a data-based function model to control an internal combustion engine, the method comprising:
   determining at least one input variable of the internal combustion engine to be varied, for which multiple output values of a corresponding output variable of the internal combustion engine are to be determined, wherein the data-based function model is defined by predefined hyperparameters and node data, multiple input variables being assigned to one output variable and having a sum of terms, each of which depends on one of the input variables;
   calculating the sum of the terms, which depend on the input variables not to be varied;
   providing multiple input values for each of the at least one determined input variable to be varied;
   ascertaining a plurality of output values of the output variable for the provided multiple input values, each based on the calculated sum of the terms, which depend on the input variables not to be varied;
   carrying out an interpolation between the input values of the input variable for the inverted calculation of the reverse-extrapolated input values of the input variable to be varied with predefinition of multiple setpoint output values of the output variable; and
   controlling the internal combustion engine based on setting the at least one input variable based on the interpolation.

8. A device for performing a calculation of a data-based function model to control an internal combustion engine, comprising:
   a processor arrangement configured to perform the following:
      determine at least one input variable of the internal combustion engine to be varied and provided as input to the model, for which multiple output values of a corresponding output variable of the internal combustion engine are to be determined using the model, wherein the data-based function model is defined by predefined hyperparameters and node data, multiple input variables being assigned to one output variable and having a sum of terms, each of which depends on an input variable;
      calculate the sum of the terms, which depend on the input variables not to be varied;
      provide multiple input values for each of the determined at least one input variable to be varied, ascertain multiple output values of the output variable for the provided multiple input values each based on the calculated sum of the terms, which depend on the input variables not to be varied; and control the internal combustion engine based on setting at least one of the at least one input variable or the at least one output variable based on the ascertained plurality of output values.

9. The device of claim 8, wherein the data-based function model is a Gaussian process model.

10. The device of claim 8, wherein an interpolation is carried out between the input values of the input variable for the inverted calculation of the reverse-extrapolated input values of the input variable to be varied with predefinition of multiple setpoint output values of the output variable.

11. A model calculation unit for calculating a data-based function model in a control unit to control an internal combustion engine, comprising:

a device for performing a calculation of a data-based function model, including a processor arrangement configured to perform the following:

determine at least one input variable of the internal combustion engine to be varied and provided as input to the model, for which multiple output values of a corresponding output variable of the internal combustion engine are to be determined using the model, wherein the data-based function model is defined by predefined hyperparameters and node data, multiple input variables being assigned to one output variable and having a sum of terms, each of which depends on an input variable;

calculate the sum of the terms, which depend on the input variables not to be varied;

provide multiple input values for each of the determined at least one input variable to be varied, ascertain multiple output values of the output variable for the provided multiple input values each based on the calculated sum of the terms, which depend on the input variables not to be varied; and control the internal combustion engine based on setting at least one of the at least one input variable or the at least one output variable based on the ascertained plurality of output values.

12. The model calculation unit of claim 11, wherein the data-based function model is a Gaussian process model.

13. The model calculation unit of claim 11, wherein an interpolation is carried out between the input values of the input variable for the inverted calculation of the reverse-extrapolated input values of the input variable to be varied with predefinition of multiple setpoint output values of the output variable.

14. A control device to control an internal combustion engine, comprising:

an arithmetic unit; and a separate model calculation unit, wherein the model calculation unit is for calculating a data-based function model in a control unit, including a device for performing a calculation of a data-based function model, including a processor arrangement configured to perform the following:

determine at least one input variable of the internal combustion engine to be varied and provided as input to the model, for which multiple output values of a corresponding output variable of the internal combustion engine are to be determined using the model, wherein the data-based function model is defined by predefined hyperparameters and node data, multiple input variables being assigned to one output variable and having a sum of terms, each of which depends on an input variable;

calculate the sum of the terms, which depend on the input variables not to be varied;

provide multiple input values for each of the determined at least one input variable to be varied, ascertain multiple output values of the output variable for the provided multiple input values each based on the calculated sum of the terms, which depend on the input variables not to be varied; and control the internal combustion engine based on setting at least one of the at least one input variable or the at least one output variable based on the ascertained plurality of output values.

15. The control device of claim 14, wherein an interpolation is carried out between the input values of the input variable for the inverted calculation of the reverse-extrapolated input values of the input variable to be varied with predefinition of multiple setpoint output values of the output variable.

16. A non-transitory computer readable medium having program instructions, which when executed by a processor perform a method for performing a calculation of a data-based function model to control an internal combustion engine, the method comprising:

determining at least one input variable of the internal combustion engine to be varied and provided as input to the model, for which multiple output values of a corresponding output variable of the internal combustion engine are to be determined using the model, wherein the data-based function model is defined by predefined hyperparameters and node data, multiple input variables being assigned to one output variable and having a sum of terms, each of which depends on one of the input variables;

calculating the sum of the terms, which depend on the input variables not to be varied;

providing multiple input values for each of the at least one determined input variable to be varied;

ascertaining a plurality of output values of the output variable for the provided multiple input values, each based on the calculated sum of the terms, which depend on the input variables not to be varied; and controlling the internal combustion engine based on setting at least one of the at least one input variable or the at least one output variable based on the ascertained plurality of output values.

17. The non-transitory computer readable medium of claim 16, wherein an interpolation is carried out between the input values of the input variable for the inverted calculation of the reverse-extrapolated input values of the input variable to be varied with predefinition of multiple setpoint output values of the output variable.

18. An electronic control unit to control an internal combustion engine, comprising:

an electronic memory medium having a computer program, which is executable by a processor, including a program code arrangement having program code for performing a calculation of a data-based function model to control the internal combustion engine, by performing the following:

determining at least one input variable of the internal combustion engine to be varied and provided as input to the model, for which multiple output values of a corresponding output variable of the internal combustion engine are to be determined using the model, wherein the data-based function model is defined by predefined hyperparameters and node data, multiple input variables being assigned to one output variable and having a sum of terms, each of which depends on one of the input variables;

calculating the sum of the terms, which depend on the input variables not to be varied;

providing multiple input values for each of the at least one determined input variable to be varied;

ascertaining a plurality of output values of the output variable for the provided multiple input values, each based on the calculated sum of the terms, which depend on the input variables not to be varied; and controlling the internal combustion engine based on setting at least one of the at least one input variable or the at least one output variable based on the ascertained plurality of output values.

19. The electronic control unit of claim 18, wherein an interpolation is carried out between the input values of the input variable for the inverted calculation of the reverse-extrapolated input values of the input variable to be varied with predefinition of multiple setpoint output values of the output variable.

\* \* \* \* \*